US008699072B2

(12) United States Patent
Ichikawa

(10) Patent No.: US 8,699,072 B2
(45) Date of Patent: Apr. 15, 2014

(54) IMAGE FORMING APPARATUS

(75) Inventor: Hiroshi Ichikawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/362,145

(22) Filed: Jan. 31, 2012

(65) Prior Publication Data

US 2012/0250034 A1 Oct. 4, 2012

(30) Foreign Application Priority Data

Mar. 30, 2011 (JP) ................................ 2011-074216

(51) Int. Cl.
*G06F 15/00* (2006.01)

(52) U.S. Cl.
USPC ........................................................ 358/1.15

(58) Field of Classification Search
USPC ........................................................ 358/1.1
See application file for complete search history.

(56) References Cited

U.S. PATENT DOCUMENTS

| | | | | |
|---|---|---|---|---|
| 5,277,415 | A | 1/1994 | Kinoshita et al. | |
| 2007/0152398 | A1* | 7/2007 | Watanabe | 271/264 |
| 2008/0203649 | A1* | 8/2008 | Watase et al. | 271/9.13 |

FOREIGN PATENT DOCUMENTS

| | | |
|---|---|---|
| JP | 04-182241 | 6/1992 |
| JP | 05-124753 | 5/1993 |
| JP | 05-319633 | 12/1993 |
| JP | H06-255845 A | 9/1994 |
| JP | H08-81091 A | 3/1996 |
| JP | 10-109787 | 4/1998 |
| JP | 11-292353 | 10/1999 |
| JP | 2003-276910 A | 10/2003 |

OTHER PUBLICATIONS

JP Office Action mailed Jul. 23, 2013, JP Appln. 2011-074216, English translation.

* cited by examiner

*Primary Examiner* — Saeid Ebrahimi Dehkordy
(74) *Attorney, Agent, or Firm* — Banner & Witcoff, Ltd.

(57) ABSTRACT

An image forming apparatus comprises: conveyance rollers for conveying paper to an image forming unit; a curved paper path for guiding paper conveyed by the conveyance rollers; and registration rollers, which are located at a downstream side of the paper path in a paper conveyance direction, for regulating the tip of paper to be conveyed to the image forming unit. The paper path has an outer guide part which constitutes an outer periphery side of the paper path, and an inner guide part which constitutes an inner periphery side of the paper path. The outer guide part is provided with an outer recess, which is depressed outward from the paper path, formed across the full width of paper. The inner guide part is provided with an inner recess, which is depressed in such a manner that the paper path expands, formed across the full width of paper.

12 Claims, 6 Drawing Sheets

IMAGE FORMING APPARATUS

CROSS-REFERENCE TO RELATED APPLICATIONS

This Nonprovisional application claims priority under 35 U.S.C. §119(a) on Patent Application No. 2011-074216 filed in Japan on Mar. 30, 2011, the entire contents of which are hereby incorporated by reference.

BACKGROUND

The present invention relates to an image forming apparatus, which is provided with a regulation member for regulating the tip position of a recording sheet to be conveyed to image forming unit.

A conventionally-known image forming apparatus is provided with a registration roller (regulation member) for regulating the tip position of a recording sheet located upstream of image forming unit in the recording sheet conveyance direction (see Japanese Patent Application Laid-Open No. H5-124753, for example). Specifically, the image forming apparatus has a curved part, which curves outward, formed at a horseshoe-shaped paper path provided between the registration roller and a conveyance roller for conveying a recording sheet to the registration roller. Such a structure makes it possible to prevent wrinkling of a recording sheet, since the recording sheet can be deflected at the curved part when the recording sheet conveyed by the conveyance roller hits the registration roller.

SUMMARY

The image forming apparatus described above however has layout constraint, since the apparatus increases in size when any other member is located lateral to the curved part. On the other hand, when prioritizing apparatus downsizing, a curved part to be formed cannot have a sufficient size and wrinkling of a recording sheet cannot be prevented completely.

The present invention is therefore intended to provide an image forming apparatus, which has sufficient space for deflection of a recording sheet in a paper path and has an increased degree of layout freedom.

In order to achieve the above objective, an image forming apparatus according to the present invention is an image forming apparatus comprising: an image forming unit for forming an image on a recording sheet; a conveyance member for conveying a recording sheet to the image forming unit; a curved paper path for guiding a recording sheet conveyed by the conveyance member; and a regulation member, which is located at a downstream side of the paper path in a recording sheet conveyance direction, for regulating a tip of a recording sheet to be conveyed to the image forming unit, wherein the paper path has an outer guide part, which constitutes an outer periphery side of the paper path, and an inner guide part, which faces the outer guide part and constitutes an inner periphery side of the paper path, the outer guide part is provided with an outer recess, which is depressed outward from the paper path, formed across a full width of a recording sheet, and the inner guide part is provided with an inner recess, which is depressed in such a manner that the paper path expands, formed across a full width of a recording sheet.

With an image forming apparatus having such a structure wherein an outer recess and an inner recess are provided at a paper path, sufficient space for deflection of a recording sheet can be reserved in comparison with a case where only one of an outer recess and an inner recess is provided. Moreover, the size of depressions of the outer recess and the inner recess can be decreased in comparison with a case where a large depression is provided at only one of an outer guide part and an inner guide part, and therefore the degree of layout freedom is increased.

Furthermore, sufficient space for deflection of a recording sheet can be reserved in a paper path and the degree of layout freedom is increased.

The above and further objects and features of the invention will more fully be apparent from the following detailed description with accompanying drawings.

DETAILED DESCRIPTION OF THE EXEMPLARY EMBODIMENTS

The following description will explain an embodiment in detail with reference to proper drawings. In the following description, a structural outline of a laser printer 1 as an example of an image forming apparatus will be explained first and then characteristic points will be explained in detail. Moreover, the following description uses directions viewed from the user who uses the laser printer 1. That is, the right side in FIG. 1 will be referred to as "front", the left side will be referred to as "back", the near side will be referred to as "left", and the far side will be referred to as "right". Moreover, the vertical direction in FIG. 1 will be referred to as "up and down".

<Structural Outline of Laser Printer>

Figure 1:
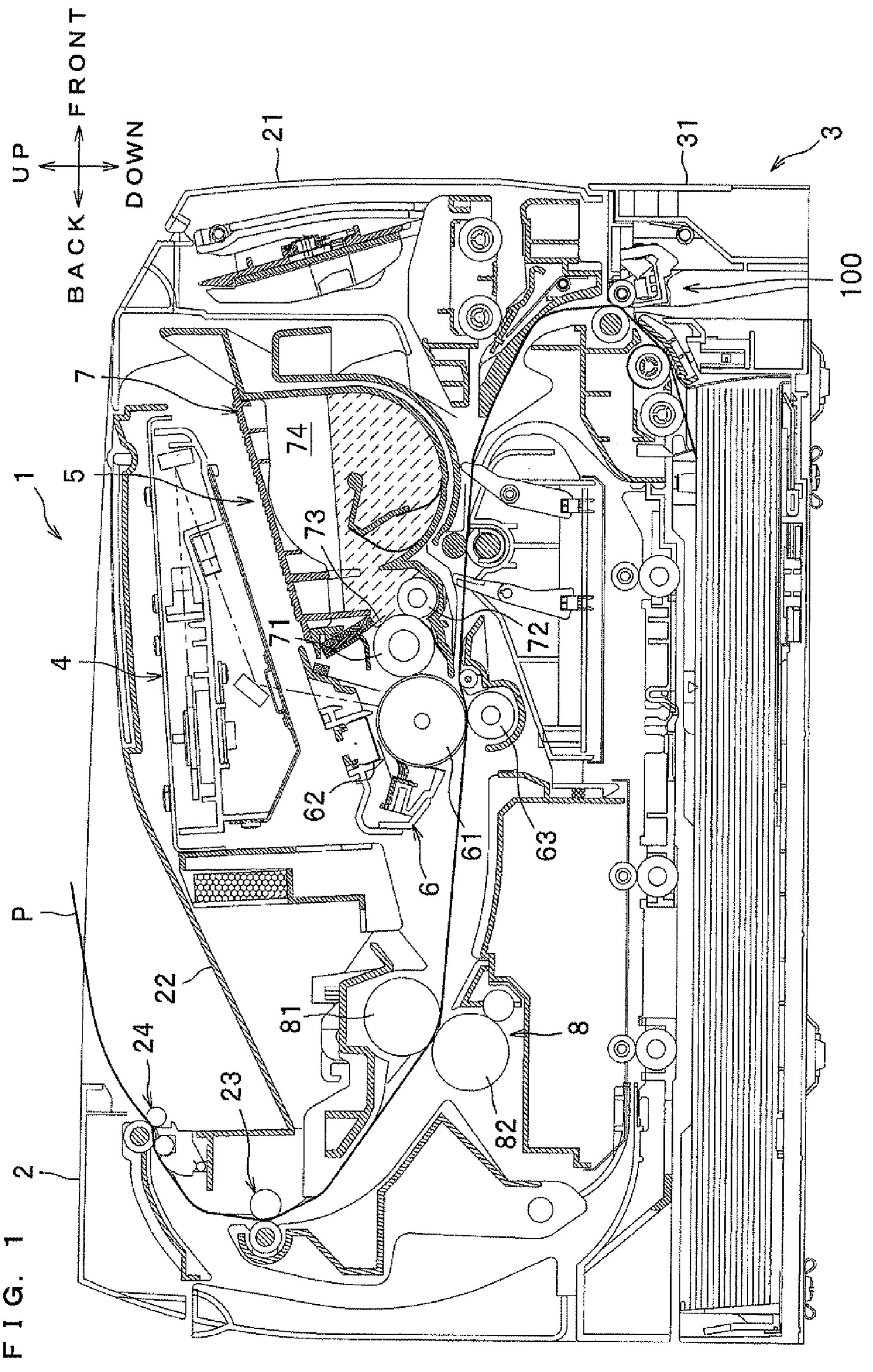
FIG. 1 is a sectional side view illustrating a laser printer according to an embodiment.

As illustrated in FIG. 1, the laser printer 1 is mainly provided with a paper feeder 3 for feeding paper P as an example of a recording sheet, an exposure device 4, an image forming unit 5 for forming an image on paper P and a fixing device 8, which are located in a body housing 2.

The paper feeder 3 is mainly provided with: a paper feed tray 31, which is located at a lower portion in the body housing 2, for holding paper P; and a paper feed mechanism 100 for conveying paper P in the paper feed tray 31 to the image forming unit 5. The paper feed mechanism 100 will be described later in detail.

The exposure device 4 is located at an upper portion in the body housing 2, and a surface of a photoconductor drum 61 is irradiated with a laser beam based on image data, which has passed a polygon mirror, a lens, a reflector and the like (see the long dashed double-short dashed line) that are unnumbered in the drawings, by rapid scanning.

The image forming unit 5 is located below the exposure device 4 and is attached to the body housing 2 through an opening, which is formed when a front cover 21 located in the body housing 2 is opened, as a detachable member. The image forming unit 5 is composed of a drum unit 6 and a developing unit 7.

The drum unit 6 is mainly provided with the photoconductor drum 61, a charger 62 and a transfer roller 63. Moreover, the developing unit 7 is attached to the drum unit 6 as a detachable member and is mainly provided with: a developing roller 71; a feed roller 72; a thickness regulation blade 73; and a toner holder 74 for holding toner (developer).

In the image forming unit 5, the surface of the photoconductor drum 61 is uniformly charged by the charger 62 and is then exposed by rapid scanning of a laser beam from the exposure device 4, so that an electrostatic latent image based on image data is formed on the photoconductor drum 61. Moreover, toner in the toner holder 74 is fed to the developing roller 71 via the feed roller 72, enters space between the developing roller 71 and the thickness regulation blade 73, and is held on the developing roller 71 as a thin layer having a uniform thickness.

Toner held on the developing roller 71 is fed from the developing roller 71 to the electrostatic latent image formed on the photoconductor drum 61. With such a structure, the electrostatic latent image is visualized and a toner image is formed on the photoconductor drum 61. The paper P is then conveyed through space between the photoconductor drum 61 and the transfer roller 63, so that the toner image on the photoconductor drum 61 is transferred onto the paper P.

The fixing device 8 is provided with a heating roller 81 and a pressure roller 82 for applying a pressure to the heating roller 81. In the fixing device 8, toner transferred onto the paper P undergoes thermal fixing while the paper P passes through space between the heating roller 81 and the pressure roller 82. The paper P, on which a toner image has undergone thermal fixing by the fixing device 8, is discharged onto a copy receiving tray 22 by copy discharging rollers 23 and 24.

<Constructional Details of Paper Feed Mechanism>

The following description will explain constructional details of the paper feed mechanism 100, which are the characteristic points. In the following description, the conveyance direction of paper P will be referred simply to as "the conveyance direction".

Figure 2:
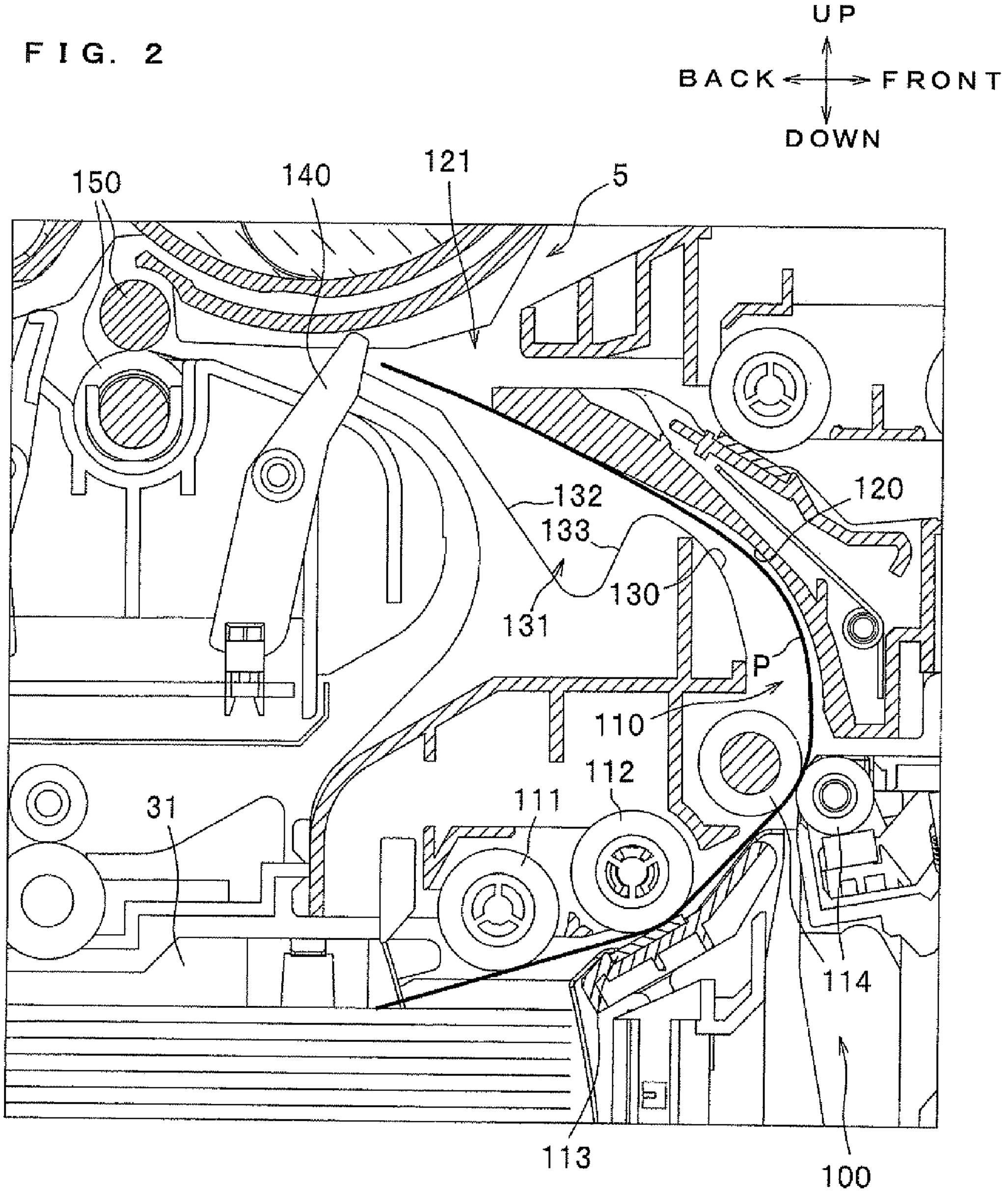
FIG. 2 is an enlarged view of a paper path according to an embodiment.

As illustrated in FIG. 2, the paper feed mechanism 100 is mainly provided with: a paper path 110 for guiding paper P, which is held in the paper feed tray 31, to the image forming unit 5; paper feed rollers 111 and 112; a separation pad 113; conveyance rollers 114; an actuator 140; and registration rollers 150 composed of a pair of rollers.

The paper path 110 is formed to extend diagonally upward forward from the paper feed tray 31 and then diagonally upward backward toward space below the image forming unit 5 so as to curve substantially in a horseshoe shape. The paper path 110 is mainly composed of an outer guide part 120 and an inner guide part 130.

The outer guide part 120 is composed of a combination of outer periphery faces of a plurality of members located ahead of the paper path 110, and constitutes the front side (outer periphery side) of the paper path 110. The outer guide part 120 is provided with an outer recess 121, which is depressed outward from the paper path 110, formed at the upstream side of the registration rollers 150, which will be described later, in the conveyance direction across the full width of paper P.

The outer recess 121 is a clearance to be formed between a plurality of members constituting the outer guide part 120 and is formed substantially at the same height as a nip part of the registration rollers 150 in such a manner that the paper path 110 expands forward. In such a structure, the outer recess 121 is allowed to receive a deflected part of paper P when the paper P is deflected with a front end position thereof being regulated by the registration rollers 150.

The inner guide part 130 faces the outer guide part 120 and constitutes the back side (inner periphery side) of the paper path 110. The inner guide part 130 is provided with an inner recess 131, which is depressed in such a manner that the paper path 110 expands, formed between the outer recess 121 and the conveyance rollers 114 across the full width of paper P.

The inner recess 131 is formed to have a larger size than that of the outer recess 121, and a slope 132 at a downstream side in the conveyance direction to paper P, which has not entered the inner recess 131, is gentler than a slope 133 at an upstream side in the conveyance direction. With such a structure, it is possible to guide paper P, which has entered the inner recess 131, toward the registration rollers 150.

The outer recess 121 and the inner recess 131 are arranged in such a manner that an upstream side of the outer recess 121 in the conveyance direction and a downstream side of the inner recess 131 in the conveyance direction overlap with each other as seen in a direction (thickness direction) perpendicular to the conveyance direction of the paper path 110. With such a structure, paper P is allowed to enter the inner recess 131 and be easily deflected after the paper P becomes unable to be deflected in the outer recess 121 any more as will be described later.

The conveyance rollers 114 are an example of a conveyance member, and are located at an upstream side of the inner recess 131 of the paper path 110 in the conveyance direction. The conveyance rollers 114 are composed of a paper dust removing roller (unnumbered) and a pinch roller (unnumbered), and paper dust on paper P is removed when the paper P passes through space between the pair of rollers. Moreover, the conveyance rollers 114 are constructed to rotate faster than the registration rollers 150, which will be described later.

The actuator 140 is a sensor for detecting paper P passing through the paper path 110, and is located between the outer recess 121 of the paper path 110 and the registration rollers 150 so as to project toward the paper path 110. The actuator 140 is supported at the body housing 2 swingably, the upper end thereof is pressed toward an upstream side in the conveyance direction by a spring or the like, which is not illustrated in the drawings, and swinging of the upper end to the upstream side in the conveyance direction is regulated by a stopper, which is not illustrated in the drawings. The actuator 140 falls to the downstream side in the conveyance direction when conveyed paper P hits the actuator 140 (see FIG. 3), and returns to the original position after the paper P has passed completely.

The registration rollers 150 are an example of a regulation member for regulating a front end position (tip position) of paper P to be conveyed to the image forming unit 5, and are located at the downstream side of the paper path 110 in the conveyance direction. A nip part is formed between the pair of registration rollers 150, since one roller thereof is pressed toward the other roller. With such a structure, the front end of conveyed paper P is regulated once in a stopped state, the position of the front end of the paper P is aligned, and then the paper P is conveyed to space between the photoconductor drum 61 and the transfer roller 63.

Figure 3:
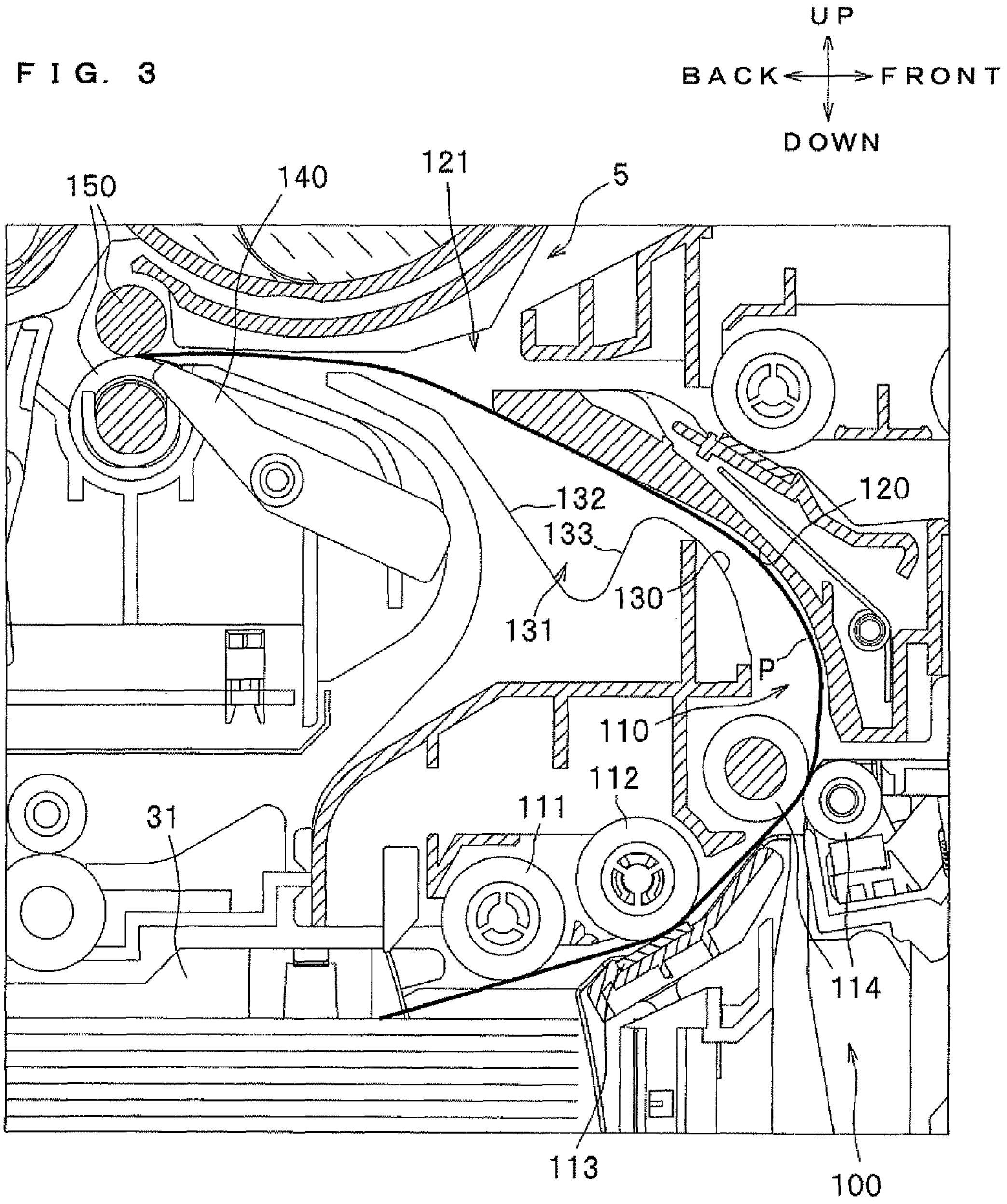
FIG. 3 is a view illustrating a state where paper in a paper path reaches registration rollers.
Figure 4:
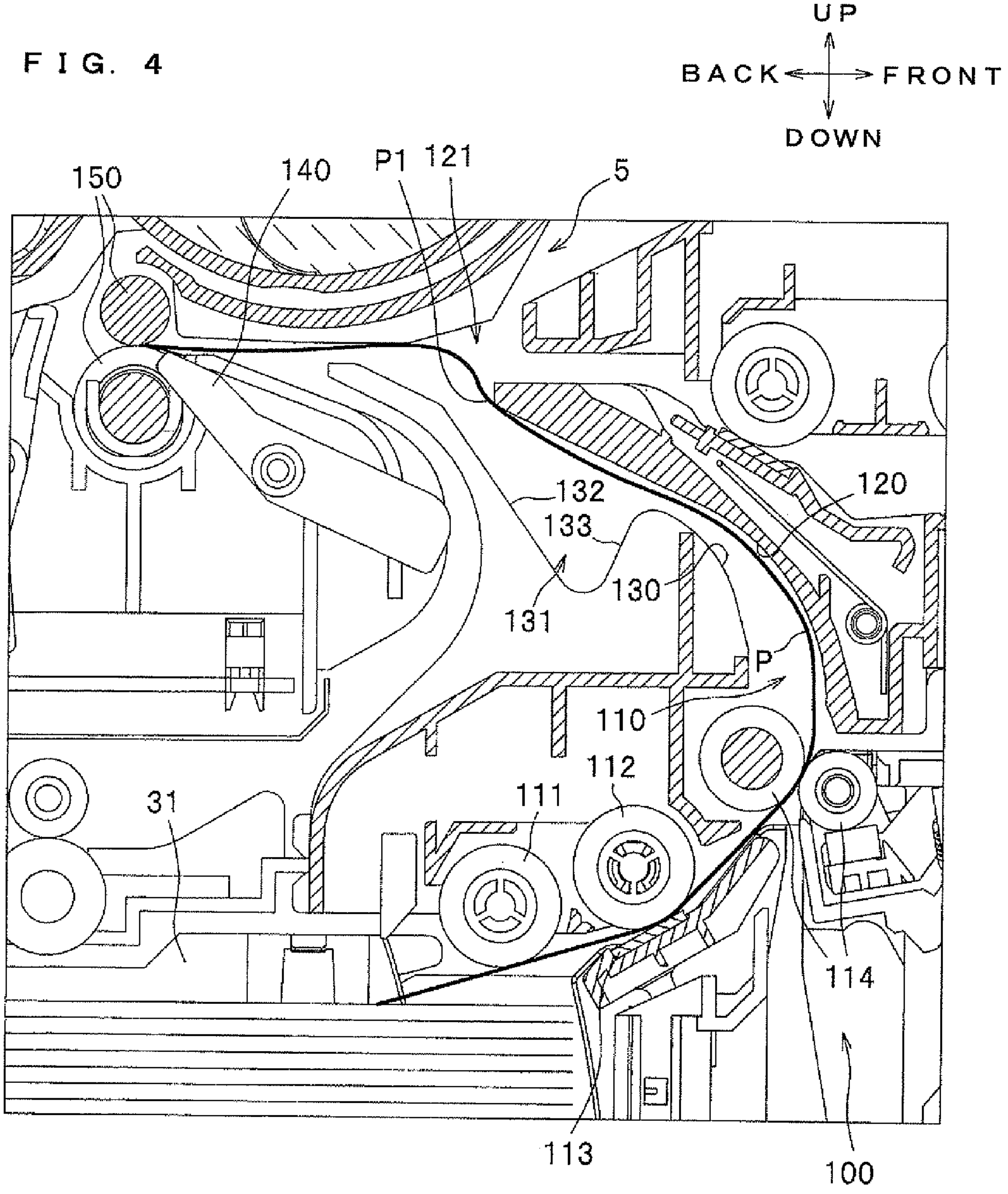
FIG. 4 is a view illustrating a state where paper in a paper path is deflected in an outer recess.
Figure 5:
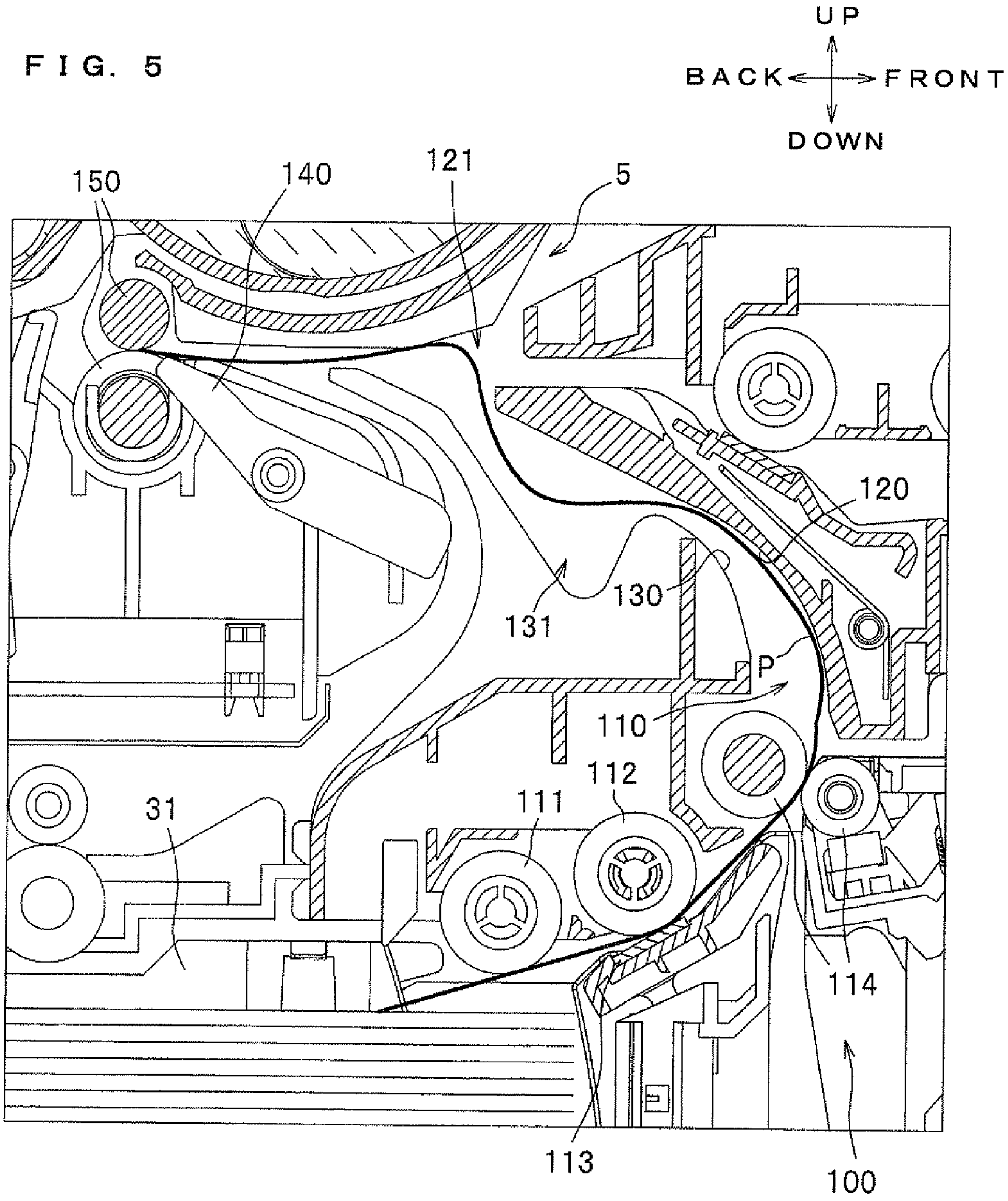
FIG. 5 is a view illustrating a state where paper in a paper path is deflected in an outer recess and in an inner recess.

In the paper feed mechanism 100 having the above structure, paper P in the paper feed tray 31 is first separated to the respective sheets and transferred to the conveyance rollers 114 by the paper feed rollers 111 and 112 and the separation pad 113. The paper P conveyed toward the image forming unit 5 by the conveyance rollers 114 is then guided to the paper path 110 and lays the actuator 140 as illustrated in FIG. 3, and then the front end thereof reaches the registration rollers 150. At this point, the conveyance rollers 114 are rotating to convey the paper P. Accordingly, the paper P, the front end of which has come into contact with the registration rollers 150, enters the outer recess 121 and is deflected as illustrated in FIG. 4. When the conveyance rollers 114 further rotate, the paper P becomes unable to enter the outer recess 121 any more and a curved part P1 projected inward swells at an upstream side end part of the outer recess 121. Then, as illustrated in FIG. 5, the swell also enters the inner recess 131 and starts to be deflected, since the upstream side of the outer recess 121 in the conveyance direction and the downstream side of the inner recess 131 in the conveyance direction overlap with each other. The paper P, the front end of which has been regulated in such a manner, is conveyed to space between the photoconductor drum 61 and the transfer roller 63 by rotation of the registration rollers 150.

Figure 6:
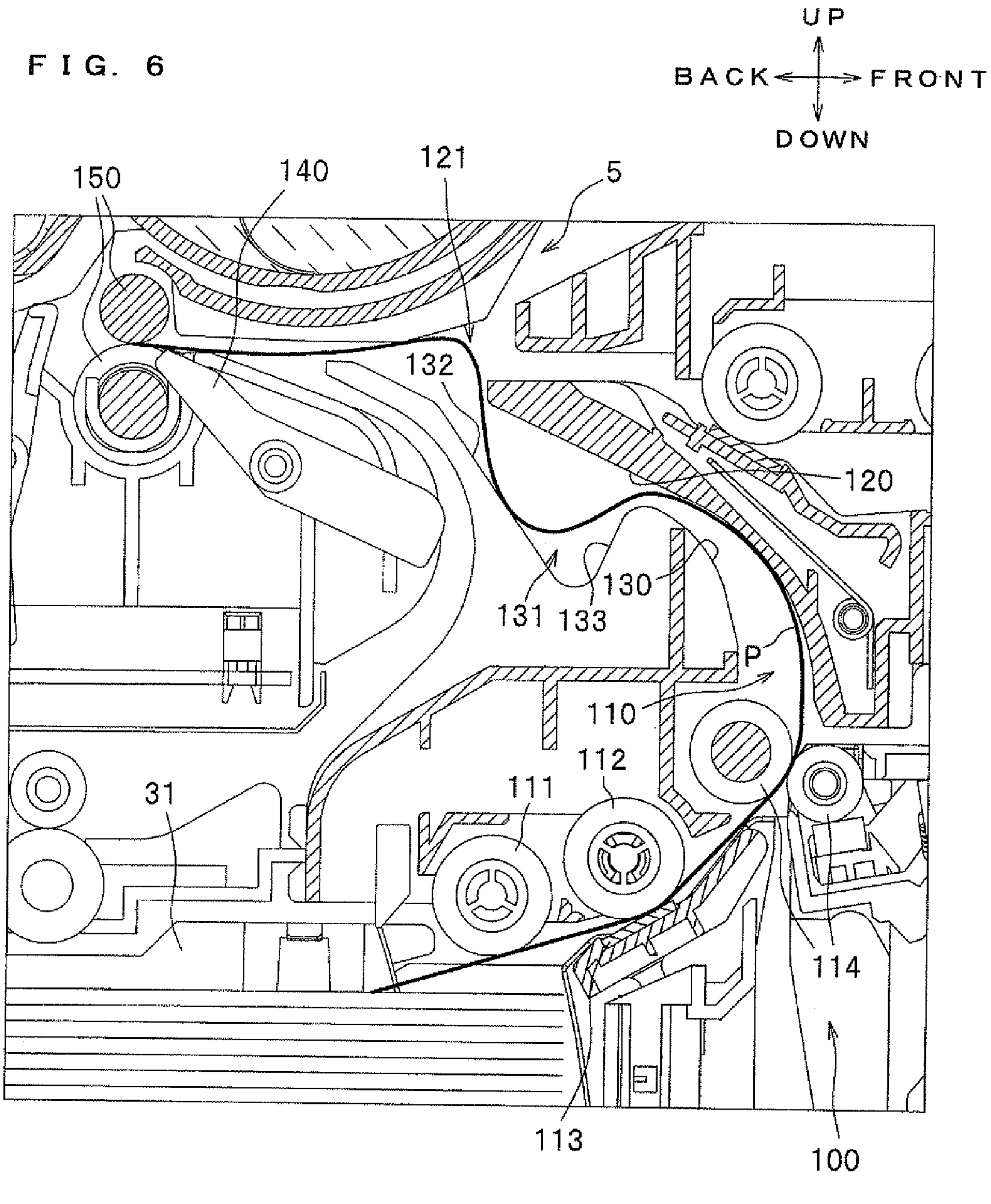
FIG. 6 is a view illustrating a state where deflection of paper in a paper path reaches the greatest amount.

When paper P is long (the dimension in the conveyance direction is large), the paper P undergoes great deflection so as to come into contact with the slope 132 of the inner recess 131 as illustrated in FIG. 6, since the rotational speed of the conveyance rollers 114 is higher than that of the registration rollers 150. Even when the paper P undergoes great deflection, the paper P is guided toward the registration rollers 150 by the slope 132 located at a downstream side of the inner recess 131 in the conveyance direction without being caught on the inner recess 131, since the slope 132 located at a downstream side of the inner recess 131 in the conveyance direction to paper P, which has not been deflected, is gentler than the slope 133 located at an upstream side of the inner recess 131 in the conveyance direction. Moreover, even when the paper P curls and the front end thereof hits the slope 132, it is also possible to guide the front end toward the registration rollers 150.

With the structure described above, the present embodiment can offer the following function effect.

Paper P conveyed through the paper path 110 is deflected when the tip thereof is regulated by the registration rollers 150. Since the outer recess 121 and the inner recess 131 are provided at the paper path 110, sufficient space for deflection of the paper P can be reserved in the paper path 110 in comparison with a case where only one of the outer recess 121 and the inner recess 131 is provided. Such a structure makes it possible to reduce wrinkling of the paper P. Moreover, the size of depressions of the outer recess 121 and the inner recess 131 can be decreased in comparison with a case where a large depression is provided at only one of the outer guide part 120 and the inner guide part 130, and therefore the degree of layout freedom in the body housing 2 is increased.

Furthermore, by forming the inner recess 131 to have a larger size than that of the outer recess 121, the laser printer 1 can be minimized in comparison with a case where the outer recess 121 is formed to have a large size.

Since a part of the outer recess 121 and a part of the inner recess 131 overlap with each other as seen in a direction perpendicular to the conveyance direction of the paper path 110, paper P, which becomes unable to enter the outer recess 121 any more, is allowed to enter the inner recess 131 easily.

Moreover, since the slope 132 at a downstream side in the conveyance direction to paper P, which has not entered the inner recess 131, is gentler than the slope 133 at an upstream side in the conveyance direction, it is possible to guide the front end of the paper P, which is deflected in the inner recess 131, toward the registration rollers 150.

Since the inner recess 131 is formed at an upstream side of the outer recess 121 in the conveyance direction, the paper P is allowed to be deflected smoothly.

Although the above description explains an embodiment of the present invention, the present invention is not limited to the embodiment. Specific structures can be modified arbitrarily without departing from the scope of the invention.

The present invention is not limited to the above embodiment wherein the inner recess 131 is formed to have a larger size than that of the outer recess 121. For example, the inner recess 131 may be formed to have a smaller size than that of the outer recess 121, or may be formed to have the same size as that of the outer recess 121.

The present invention is not limited to the above embodiment wherein the inner recess 131 is located at an upstream side of the outer recess 121 in the conveyance direction. For example, the inner recess 131 may be located at a downstream side of the outer recess 121 in the conveyance direction.

The present invention is not limited to the above embodiment wherein the registration rollers 150 are used as a regulation member. For example, a regulation member may be a gate, which is provided in the paper path 110 so as to be swingable between a position to come into contact with the front end of the paper P and a retracted position. The gate is constructed to be displaced to the retracted position while aligning the front end of paper P when the tip of the paper P comes into contact with the gate.

The present invention is not limited to the above embodiment wherein the inner guide part 130 is made up of one component. For example, the inner guide part 130 may be composed of a plurality of components.

The present invention is not limited to the above embodiment wherein a laser printer 1 is used as an image forming apparatus. For example, an image forming apparatus may be a copying machine, a multifunction peripheral or the like, or may be a color printer, a color copying machine, a color multifunction peripheral or the like for forming a multicolor image.

The present invention is not limited to the above embodiment wherein paper P such as cardboard, a postcard or thin paper is used as a recording sheet. For example, a recording sheet may be an OHP sheet.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus comprising:

an image forming unit for forming an image on a recording sheet;

a conveyance member for conveying a recording sheet to the image forming unit;

a curved paper path for guiding a recording sheet conveyed by the conveyance member; and a regulation member, which is located at a downstream side of the paper path in a recording sheet conveyance direction, for regulating a tip of a recording sheet to be conveyed to the image forming unit, wherein the paper path has an outer guide part, which constitutes an outer periphery side of the paper path, and an inner guide part, which faces the outer guide part and constitutes an inner periphery side of the paper path, the outer guide part is provided with an outer recess, which is depressed outward from the paper path, formed across a full width of a recording sheet, and the inner guide part is provided with an inner recess, which is depressed outward from the paper path, formed across a full width of a recording sheet.

2. The image forming apparatus according to claim 1, wherein the inner recess is formed to have a larger size than the outer recess.

3. The image forming apparatus according to claim 1, wherein at least a part of the outer recess and at least a part of the inner recess overlap with each other as seen in a thickness direction of the paper path.

4. The image forming apparatus according to claim 1, wherein a slope at a downstream side of the inner recess in the conveyance direction to a recording sheet, which has not entered the inner recess, is gentler than a slope at an upstream side of the inner recess in the conveyance direction.

5. The image forming apparatus according to claim 1, wherein the inner recess is formed at an upstream side of the outer recess in a recording sheet conveyance direction.

6. The image forming apparatus according to claim 1, wherein the conveyance member is a conveyance roller, the regulation member is a registration roller, and the conveyance roller rotates faster than the registration roller.

7. The image forming apparatus according to claim 1, further comprising a detection member, which is located at the paper path, for detecting the recording sheet passing through the paper path.

8. The image forming apparatus according to claim 7, wherein the detection member is pressed toward an upstream side in a recording sheet conveyance direction.

9. The image forming apparatus according to claim 7, wherein swinging of the detection member to an upstream side in a recording sheet conveyance direction is regulated.

10. An image forming apparatus comprising:

a conveyance roller for conveying a recording sheet in a conveying direction;

a regulation member for regulating a tip of a recording sheet;

an outer guide member for guiding a recording sheet and disposed between the conveyance roller and the regulation member, and having a first end and a second end opposite to the first end in a direction perpendicular to the conveying direction; and an inner guide member for guiding a recording sheet and facing the outer guide member, and having a third end and a fourth end opposite to the third end in a direction perpendicular to the conveying direction, wherein the outer guide member has an outer recess extending from the first end to the second end, and wherein the inner guide member has an inner recess extending from the third end to the fourth end.

11. An image forming apparatus comprising:

a conveyance roller for conveying a recording sheet in a conveying direction;

a regulation member for regulating a tip of a recording sheet;

an outer guide member for guiding a recording sheet and disposed between the conveyance roller and the regulation member, and having a first end and a second end opposite to the first end in a direction perpendicular to the conveying direction; and an inner guide member for guiding a recording sheet and facing the outer guide member, and having a third end and a fourth end opposite to the third end in a direction perpendicular to the conveying direction, wherein the outer guide member has an outer recess extending from the first end to the second end, wherein the inner guide member has an inner recess extending from the third end to the fourth end, and wherein a distance between the outer guide member and the inner guide member at an upstream side of the inner recess and a distance between the outer guide member and the inner guide member at a downstream side of the outer recess are narrow in comparison with a distance between the outer guide member and the inner guide member at any other region.

12. The image forming apparatus according to claim 11, wherein the outer guide member and the inner guide member between the conveyance roller and the regulation member are curved.

* * * * *